(12) United States Patent
Straayer et al.

(10) Patent No.: US 7,289,107 B1
(45) Date of Patent: Oct. 30, 2007

(54) AUTO-CALIBRATION OF POINTING DEVICES USED IN A COMPUTER USER INTERFACE

(75) Inventors: David H. Straayer, Citrus Heights, CA (US); Michael Rogers, El Dorado Hills, CA (US)

(73) Assignee: Varatouch Technology, Inc., Sacramento, CA (US)

( * ) Notice: Subject to any disclaimer, the term of this patent is extended or adjusted under 35 U.S.C. 154(b) by 0 days.

(21) Appl. No.: 09/523,407

(22) Filed: Mar. 10, 2000

Related U.S. Application Data

(60) Provisional application No. 60/124,137, filed on Mar. 12, 1999.

(51) Int. Cl.
G09G 5/08 (2006.01)

(52) U.S. Cl. .................. 345/161; 345/157; 345/160

(58) Field of Classification Search ............ 345/160, 345/161, 156, 157, 167
See application file for complete search history.

(56) References Cited

U.S. PATENT DOCUMENTS

| | | | |
|---|---|---|---|
| 3,621,439 A | 11/1971 | Newbery | .............. 338/180 |
| 4,710,758 A | 12/1987 | Mussler et al. | |
| 4,903,012 A | 2/1990 | Ohuchi | |
| 5,428,355 A * | 6/1995 | Jondrow et al. | ............ 345/161 |
| 5,521,596 A * | 5/1996 | Selker et al. | ............... 345/161 |
| 6,057,540 A * | 5/2000 | Gordon et al. | ............... 345/161 |
| 6,115,030 A * | 9/2000 | Berstis et al. | ............... 345/161 |
| 6,184,865 B1 * | 2/2001 | Zimmerman et al. | ....... 345/161 |
| 6,313,826 B1 * | 11/2001 | Schrum et al. | ............. 345/161 |

FOREIGN PATENT DOCUMENTS

DE   196 06 408 A1   8/1997

\* cited by examiner

*Primary Examiner*—David L. Lewis
(74) *Attorney, Agent, or Firm*—Charles J. Kulas; Townsend and Townsend and Crew, LLP

(57) ABSTRACT

A pointing device in a computer system is automatically calibrated by distinguishing between "in presence" and "out of presence" conditions. Calibration correction accommodates differing geometry of users' hands and fingers. Thus, the "natural" "home" position may be different for left-handers or right-handers, or if the device is operated with a thumb versus a forefinger. A system monitors user activity and from that activity automatically selects X-Y values for auto-calibration. "First touch" and "click" activities are used to select proper X-Y values for auto-calibration. "Click from out of presence" is used to determine user selection events for proper calibration. The invention provides "hardware help" for detecting and calibrating a "first touch."

4 Claims, 6 Drawing Sheets

Not in "Presence"

In "Presence"

Clicking (Dome Switch collapsed)

Clicking "On the Fly"

Not in "Presence"

In "Presence"

Clicking (Dome Switch collapsed)

Clicking "On the Fly"

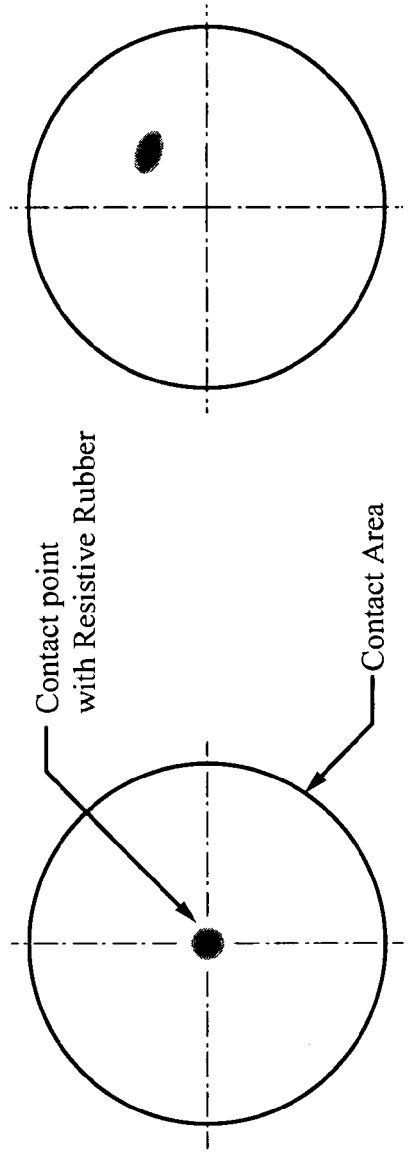
Fig. 5
Typical "Ninja landing" contact
Fig. 6
Typical "hit the decks running" contact
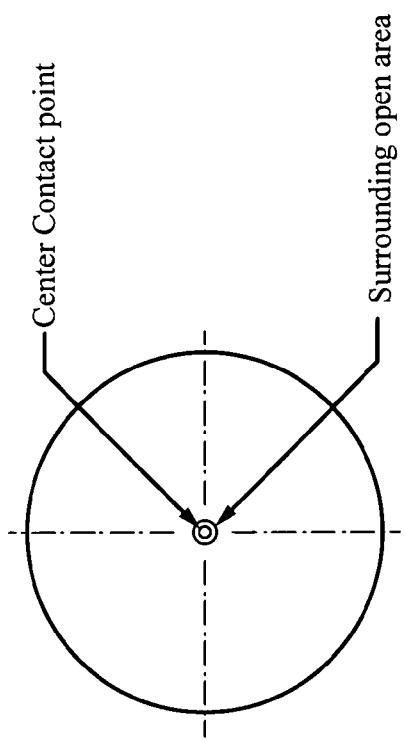
Fig. 7
"Hardware Help" for auto-calibration

AUTO-CALIBRATION OF POINTING DEVICES USED IN A COMPUTER USER INTERFACE

CLAIM OF PRIORITY

This patent application claims priority from co-pending provisional patent application Ser. No. 60/124,137 filed Mar. 12, 1999 entitled METHOD FOR AUTO-CALIBRATING OF POINTING DEVICES BASED ON RESISTIVE RUBBER which is hereby incorporated by reference as if set forth in full in this document.

COPYRIGHT NOTICE

A portion of the disclosure recited in this application contains material which is subject to copyright protection. Specifically, source code is provided for a computer program implementing portions of the invention as described herein. The copyright owner has no objection to the facsimile reproduction of the specification as filed in the Patent and Trademark Office. Otherwise all copyright rights are reserved.

BACKGROUND OF THE INVENTION

This invention relates in general to computer user input devices and more specifically to a method and apparatus for achieving a more accurate relative pointing device in a computer user interface.

Today's graphical computer user interfaces typically use some form of "relative pointing device" (RPD) for moving a pointer, cursor, or the like around on a display screen. Examples of RPDs include a mouse, joystick, touchpad, trackball, etc. One approach at implementing these devices uses a material that exhibits varying electrical properties as a function of applied pressure, or position, of a control object, or surface, manipulated by a user. The use of such materials introduces problems in that the measurement of the resistance, conductance, capacitance or other property of the material is not always constant, or consistent, enough to use the pointing device for precise, stable, and consistently accurate positioning in a computer user interface.

For example, where resistive rubber is used as the sensing material the undesirable property of "drift" presents itself. Drift results from miscalibration of a "zero" position, or other reference position, for the pointing device. "Drift" is perceived by a user of the device as spurious or inaccurate movement of a pointer, or other image or object, that is controlled by the device. Differences in material, composition, components, temperature, geometry of finger placement, etc., all contribute to whether the device is properly centered, or whether there is drift. A properly calibrated device allows the user to easily make fine position motions. An improperly calibrated device will exhibit drift and be difficult to control.

A common user manipulation is to position a pointer by using the RPD and then depress a button, or other control, to indicate selection of an item selected by the pointer. Before, during or after the user's act of depressing the control it is usually important that the pointer does not change position. When such an unwanted change in position takes place as a result of miscalibration it is referred to as "drift". There are other consequences of "drift". If the user is trying to make a fine cursor movement while drift is present then the user is forced to compensate by applying pressure against the drift. This feels rather like trying to walk on very slippery ice in a strong windstorm. Another consequence of miscalibration is reduced dynamic range in the direction "against the drift". Some or all of the movement range of the device can be absorbed in an attempt to counter the drift, leaving less range available for intended manipulation.

Thus, it is desirable to reduce or eliminate the problem of miscalibration and drift in a pointing device.

SUMMARY OF THE INVENTION

The present invention automatically compensates for variations in the components that make up a pointing device used as an input device in a computer system. A preferred embodiment of the invention is adapted to a finger-operated pointing device. Automatic calibration ensures that calibration is performed, as opposed to manual calibration or other conditionally-performed calibration. Automatic calibration also frees the user from having to understand and perform the calibration procedure and eliminates the cost and size requirements of devices (e.g., "trim pots" in typical joysticks) necessary to perform the calibration.

Another aspect of the invention is to correct for differing geometry of users' hands and fingers as the user depresses the pointing device. The "natural" "home" position may be different for left-handers or right-handers, or if the device is operated with a thumb versus a forefinger.

One aspect of the invention includes a system that monitors user activity and, from that activity, automatically selects X-Y values for auto-calibration.

Another aspect of the invention makes specific use of "first touch" and "click" activities to select proper X-Y values for auto-calibration.

Yet another aspect of the invention improves the accuracy in a "click from out of presence" manipulation.

Yet another aspect of the invention uses hardware for detecting and calibrating a first touch.

BRIEF DESCRIPTION OF THE DRAWINGS

FIG. 5 shows a contact point on a contact area;

FIG. 6 shows a contact point on an off-center portion of the contact area as a result of a user clicking while positioning at the same time;

FIG. 7 shows a center contact point surrounded by an insulated area;

DESCRIPTION OF THE SPECIFIC EMBODIMENTS

System Description

One type of pointing device has two states referred to as "in presence" or "out of presence." This refers to the ability of the device to allow movement of a control, such as a small "stick" control operated by a finger, in two different modes. In a first, "in presence" mode, a pointer is moved in accordance with the movement of the stick. In the second "out of presence" mode the pointer on the display screen does not move even when the stick is being moved. Typically, a user can decide whether the stick is moved in or out of presence by applying slight downward pressure while the stick is being manipulated. If downward pressure is applied as the stick moves, this is an "in presence" movement and the pointer is moved accordingly. When the downward pressure is released then the stick can be moved without moving the pointer. This is useful when the stick needs to be returned to a "home" position for further movement of the pointer. This is analogous to the mouse-and-pointer scenario where a user must lift up the mouse and then put the mouse back down in order to keep the mouse within an area (such as a mouse "pad" area) and to continue moving the pointer in the desired direction.

In one embodiment, referred to as "first touch," the X-Y position of the device at the instant it first enters "presence" is detected. This location is used as a bias pair coordinate value for subsequent pointing activity. Another approach is available on a pointing device that has an integrated switch for clicking. It is possible to take the X-Y position of the device at the instant it "clicks". Further refinements assess the users' intention to determine which "first touch" and "click" activities yield X-Y positions suitable for auto-calibration.

Another embodiment detects when a user is clicking from out of presence. That is, when a user is indicating a selection by making a hard downward depressing movement of the control stick. This system works on a finger-operated pointing system with integrated "click" switch. The switch is built into the control so that a user can trigger the click by increasing the Z component of pointing force without having to remove the finger from the device to find and use external switches. One type of pointing device for which this invention is applicable has distinct "presence" and "not in presence" modes.

Figure 1:
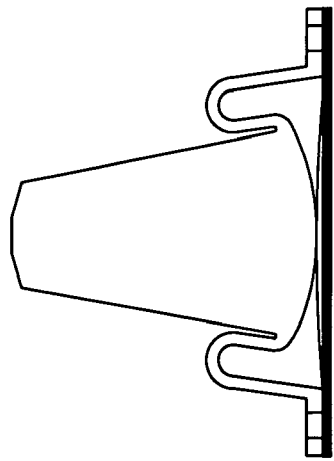
FIG. 1 shows a pointing device in an "out of presence" condition.
Figure 2:
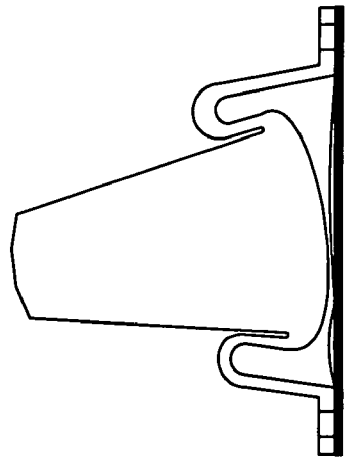
FIG. 2 shows a pointing device in an "in presence" condition.
Figure 3:
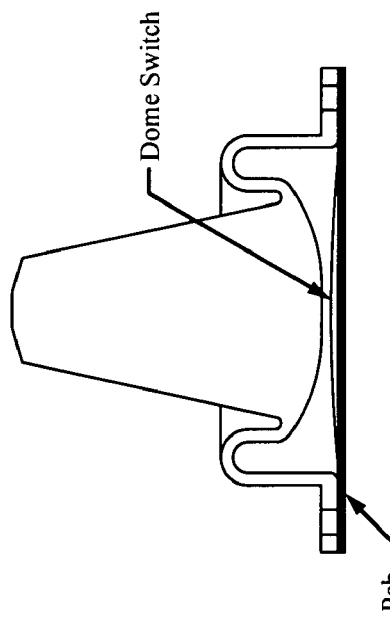
FIG. 3 shows a "click," or selection.
Figure 4:
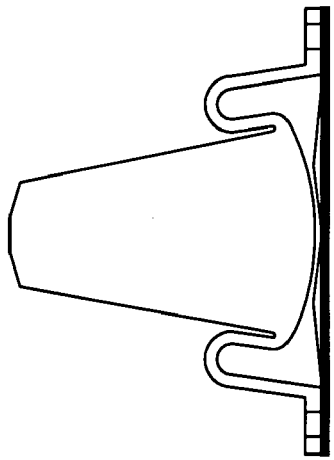
FIG. 4 shows a "click, or selection, on the fly.

In a preferred embodiment, "presence" is denoted by contact between the resistive rubber and the conductive surface beneath it. FIG. 1 shows a specific device referred to as "VaraPoint," manufactured by Varatouch Technology, Inc., In FIG. 1, the device is "not in presence." FIG. 2 shows the VaraPoint device "in presence." One embodiment of the present invention is a method of creating and using a "usage profile" that gives a reliable indication of which position of the device the user expects to be associated with zero motion. Earlier attempts at auto-calibration used the X-Y coordinates of the device at the instant in time when the user performed a click, or kept a running average of those X-Y pairs associated with clicks. FIGS. 3 and 4 show two possible "click" events. This algorithm is different, in that it distinguishes between clicks for which the associated X-Y position is likely to be a good calibration point, and those for which it is not.

In particular, there are two distinguishable patterns of clicking "out of presence" clicking, and "clicking on the fly". "Out of presence" clicking occurs when the user has positioned the tracking cursor carefully above a target, temporarily released finger pressure (to take the device out of "presence" mode), and then made a distinct click without intended motion. FIG. 3 shows a typical "out of presence" click. Clicking on the fly occurs when the user drifts the tracking cursor over a target, and clicks while it is moving. FIG. 4 shows a typical "on the fly" click. The key distinction between these behaviors is whether and for how long the device was "out of presence" before the click. The essence of the invention is the use of the X-Y location associated with the "out of presence" clicking for auto-calibration, and, especially, not using the X-Y data of a click that occurred "on the fly". The initial auto-calibration is performed on the first "out of presence" click, and subsequent re-calibration occurs either as a running average of subsequent "out of presence" clicks (the preferred embodiment), or by simply replacing centering bias X-Y values with those of subsequent "out of presence" clicks.

Software for performing the "out of presence" sensing and calibrating is included with this application in several files under the subdirectory label "pr25b." Such software should be consulted for more details on the preferred embodiment of this aspect. The directory paths for each file are listed at the bottom of each page of the source code listing associated with the file. Specifics of the software are next discussed.

Source Code (Firmware)

Figure 8:
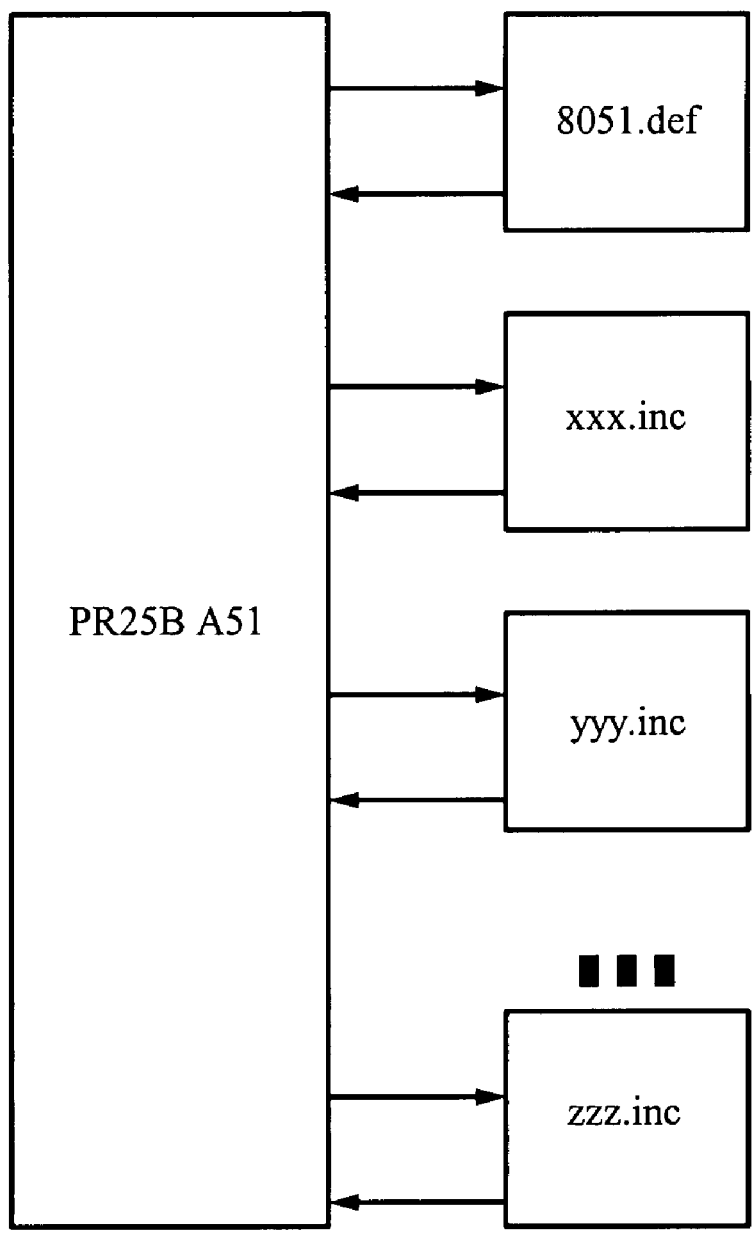
FIG. 8 illustrates the basic file organization of the firmware.
Figure 9:
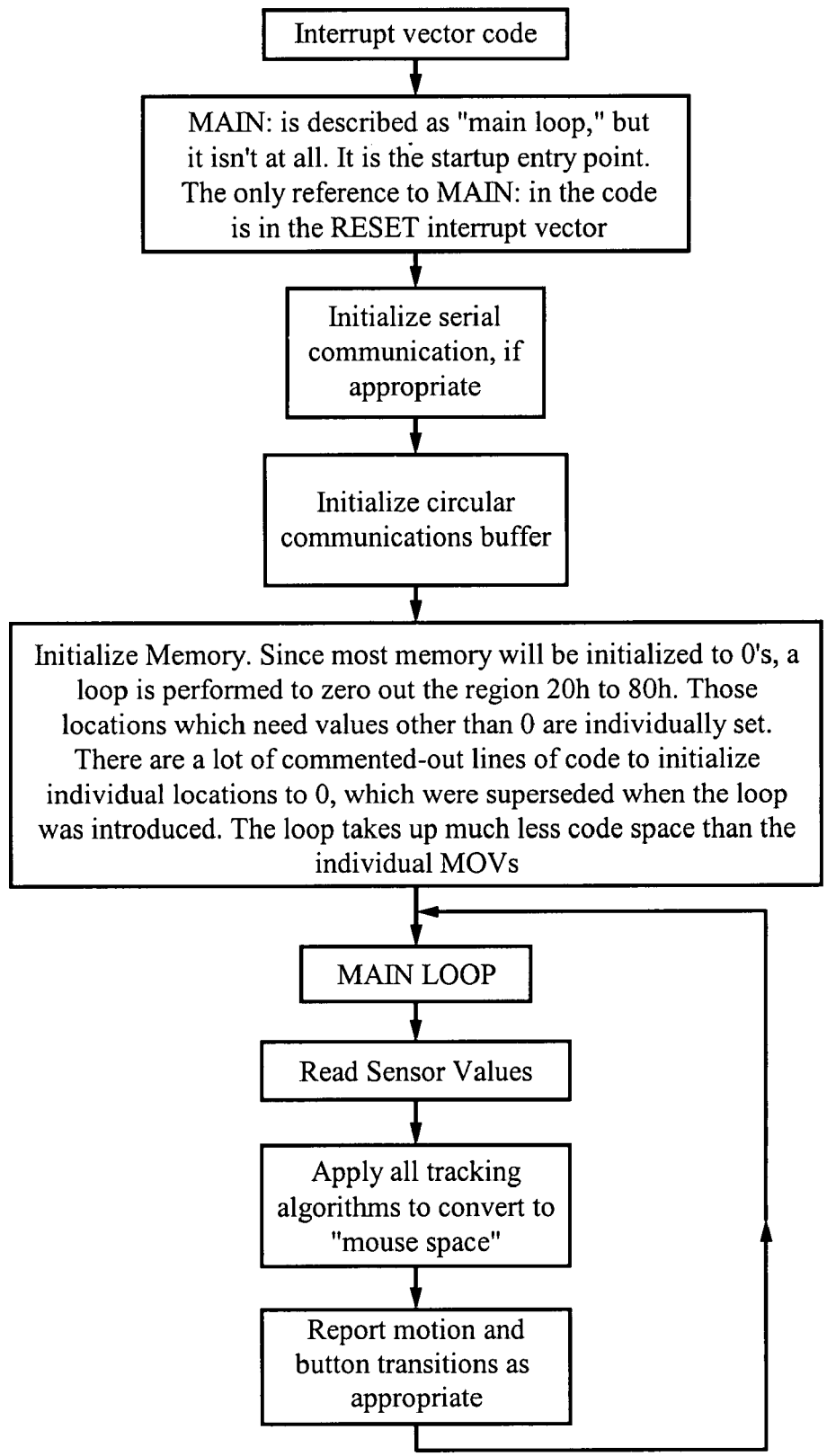
FIG. 9 shows "main loop" processing of the firmware.

A preferred embodiment of the invention uses source code, or firmware, included in the appendix. This firmware produces a system compatible with a Microsoft Mouse (either serial or PS/2). The VaraPoint sensor used in the invention provides an analog output signal. The firmware in the preferred embodiment digitizes the analog signal to 5 bit (32 step) resolution. Other interfaces, e.g., a game controller interface, can be used in place of the mouse interface. The firmware produces code to be run on an Atmel 89C2051 CPU. The basic file organization of the firmware is illustrated in FIG. 8. The "main loop" processing is illustrated by the flowchart of FIG. 9. The firmware of the preferred embodiment can be adapted for use with any suitable microprocessor that meets the system requirements (see below). In some applications, the code to support the VaraPoint device may coexist with other code in the microprocessor, for example, to scan buttons on a remote control device or keyboard. The The software has the following options, which can be used to generate different versions via conditional assembly:

a) MSMOUSE or PS2MOUSE

These two mutually exclusive switches determine whether the assembler will generate code to emulate a Microsoft Serial Mouse or a PS/2 Mouse. Naturally, it is possible to implement different interfaces for a pointing device in applications other than Microsoft Windows support.

b) PUSHDOWN

This switch determines whether code will be generated to support a switch under the VaraPoint device to generate "mouse clicks". A click is commonly a part of most pointing activity, in which the user indicates an intent to take some action with the object to which the user is currently pointing. In some applications a separate switch is provided, which may be scanned in other code, or by some other processor.

c) SNAPTOGRID

This switch determines whether code will be generated to cause motion near a multiple of 90 degrees to "snap" to those directions. This switch is normally turned on when the application involves Graphical User Interface (GUI) menu navigation, etc. It would be less desirable if the primary application involved sketching and drawing.

d) NAVIGATEMENU

This switch determines whether code will be generated to cause motion near a multiple of 45 to "snap" to those directions. It is much like the SNAPTOGRID switch, but allows "snapping" to the true axes and the 45-degree diagonals. As with SNAPTOGRID, the intended application would dictate whether this switch should be set.

e) AUTOCENTER

This switch determines whether code will be generated to cause the system to recalibrate itself for "centering", the position at which no motion is generated. In any joystick, or joystick-like pointing device, any of a number of situations can cause the "null" position to be other than where the user expects it. This can cause a perception of "skating in the wind", or "drift". This switch would normally be turned on, except perhaps for some unusual applications in which the autocentering behavior conflicts with other design goals. With this switch turned on, the system automatically recalibrates itself based on a rolling average of contact points, with automatic compensation for outlying values.

f) Presence

The Presence value helps the system to distinguish between two different types of clicks. The "in-presence" click is also known as the "click-on-the-fly" or "bombing-run" click—in which the user lets the cursor drift over the target, and clicks during movement. This type of click is unsuitable for auto-centering and must be avoided. On the other hand, the "out-of-presence" click occurs when the user has stopped pointing, and makes the click with a frozen cursor. This type of click is generally very suitable for auto-centering. The current algorithm is, on a click, to determine whether "presence" scans have taken place since initiating pointing. If so, we assume that there was so much time in the pointing immediately prior to the click that it should be deemed an "in-presence" click and made ineligible for auto-centering. If not, we then check to see if auto-centering has been performed yet. If we have never auto-centered yet, the current coordinates are taken as the autocentering values. If we have previously autocentered, we now initiate a rolling-average of the last four values, to guard against false auto-centering.

There are a number of switches in the form "PD~" in the code which cause code to be assembled to output diagnostic information on the serial port. These switches and diagnostic information are used for debugging purposes.

The routine ScanSensor essentially implements an Analog to Digital (A/D) conversion to produce 5 bit data values representing the X and Y components of the deflection of the VaraPoint sensor.

The implementation of this task is illustrated using a Microchip PIC 1 6C54 microcontroller. This circuit also includes a wakeup circuit which can be used in battery operated applications where the microcontroller is to be put into a low power "sleep mode" when there is no VaraPoint activity. While the VaraPoint deflection is being measured (i.e. while the microcontroller is active) the signal "WAKE ENABLE" is at a high-impedance state, effectively taking the wakeup circuit out of consideration.

The resistance between the direction outputs of the VaraPoint module and Vcc is measured by: 1) Fully discharging the 0.047 uF timing capacitors through pins 0 . . . 3 of PORTB of the microcontroller (by configuring those pins as outputs and setting their level LOW), 2) Switching pins 0 . . . 3 of PORTB of the microcontroller to high-impedance input mode, and 3) Measuring the time it takes for the timing capacitors to charge to the point that the microcontroller reads an input HIGH at each of pins 0 . . . 3 of PORTB.

The chain of conversions described above is summarized as 1) convert from joystick deflection to resistance, and 2) convert from resistance to capacitor charging time (which is easily measured by the microcontroller).

The resistance of a VaraPoint direction is nominally 50K Ohms at minimum deflection (and >1M Ohm at no deflection). The time to charge a capacitor to the microcontroller's input HIGH level is 0.6*R*C, so at minimum deflection the charge time is 1.410 msec. The window of time that the microcontroller samples the direction inputs is 1.397 msec (127 samples of each direction input*1 lusec per sampling loop—see assembly listing). So the microcontroller reads a minimum deflection at a slightly larger than minimum physical deflection on a nominal VaraPoint (this must be the case for a nominal setup so that we can always attain a minimum deflection taking variation of component values into account). As deflection is increased, the charge time is decreased, since the direction's resistance to Vcc is decreased. If the charge time is longer than the 1.397 msec sampling window, this is read as no deflection at all.

Figure 10A:
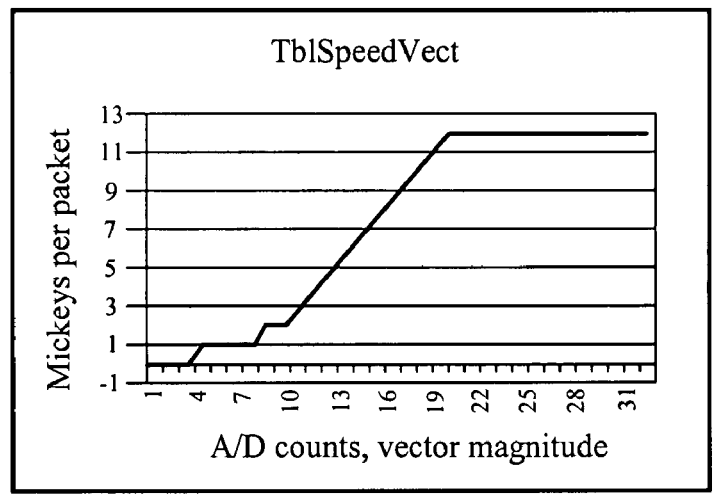
FIG. 10A illustrates first table values used to affect tracking.
Figure 10B:
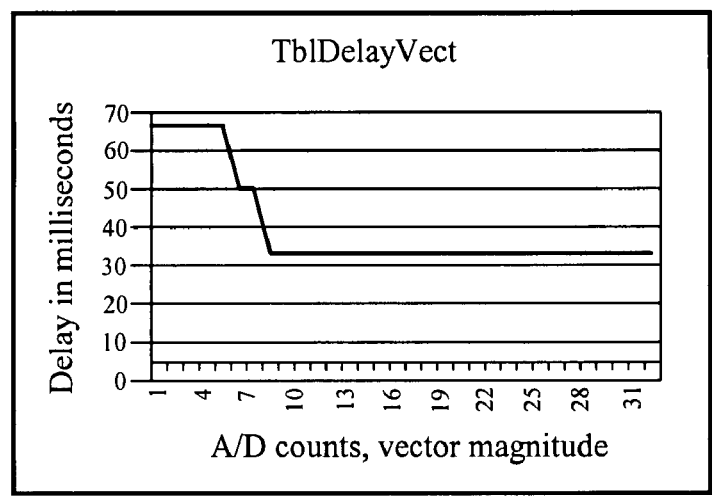
FIG. 10B illustrates second table values used to affect tracking.
Figure 10C:
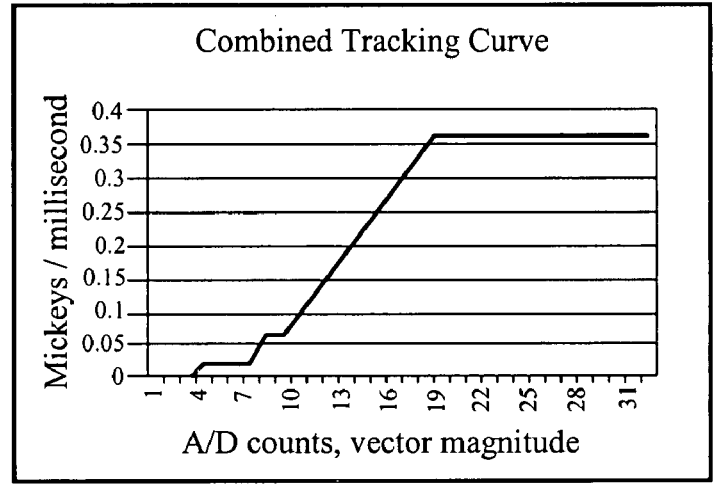
FIG. 10C illustrates third table values used to affect tracking.
Figure 11:
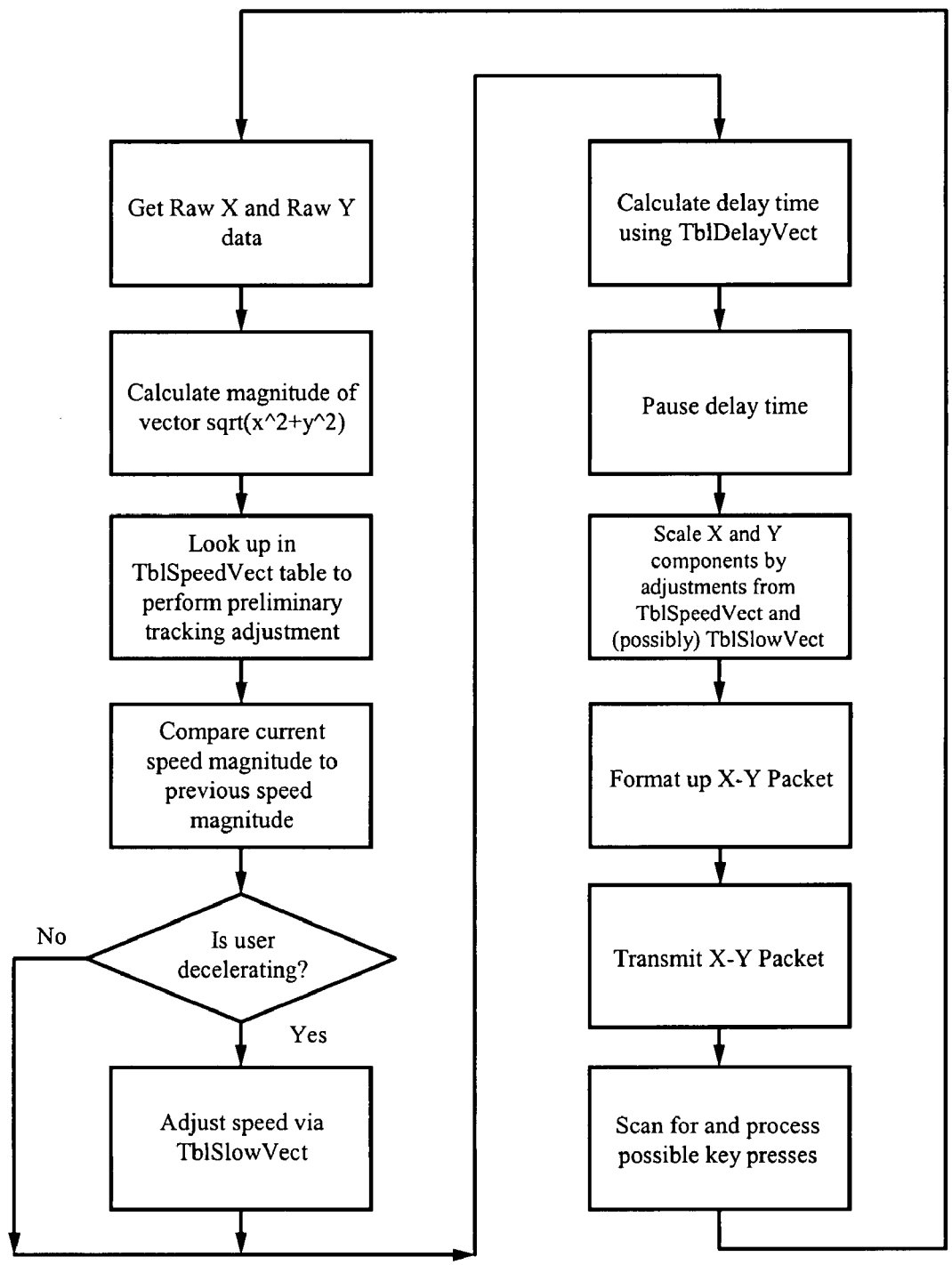
FIG. 11 is a flowchart to illustrate the basic steps of the tracking procedures.

FIGS. 10A-C illustrate table values used to affect tracking. FIG. 11 is a flowchart to illustrate the basic steps of the tracking procedures. The source code appendix should be consulted for details.

The Th1SpeedVect and Th1DelayVect tables work together to implement the main part of VaraPoint tracking. These tables are normally adjusted together to account for differences in microprocessor speed and A/D circuits (such as different reference voltages, resistor and capacitor values, etc.). Together, these tables implement a "Three Plateaus" approach to tracking: Fine Control, Navigation, and Blitz. A general strategy for adjusting these tables is to compare a trial implementation with a reference design VaraPoint, and to try to achieve a similar level of control. Fine-tuning is best accomplished with user-level tests.

Th1SpeedVect is the primary tracking table, working in conjunction with Th1DelayVect. Th1SpeedVect contains 32 entries, for each of 32 possible input counts (coming from the A/D circuit). For each input count, Th1SpeedVect gives the number of output counts ("Mickeys") that the firmware should report. These Mickeys correspond to the counts normally made by optical encoders in a typical 300-dpi mouse. Thus, when the A/D measures a force corresponding to NNN counts from the A/D, the system will report Th1SpeedVect(NNN) Mickeys on each report out, which will occur every Th1DelayVect(NNN) milliseconds.

The Th1DelayVect table works in conjunction with Th1SpeedVect to condition the apparent rate of motion reported by the firmware. The Th1SpeedVect/Tb1DelayVect system is an alternative to "Fractional Mickey" tracking, which would have to be maintained if the motion would correspond to less than one Mickey (usually 1/300 of an inch) per packet of data sent out. By delaying the time between packets, the effective rate of motion is kept appropriately low when the intended motion is slow.

Th1SlowVect manages an important aspect of VaraPoint tracking—an alternative tracking during deceleration to manage the "overshoot" which so often otherwise characterizes joystick pointing. During tracking, the firmware always remembers the last force vector magnitude, and continually compares it to the current force vector magnitude. When the magnitude is decreasing, then the user is attempting to slow down. The difference between last and current magnitude will be positive during deceleration, and is used as an index into the Th1SlowVect to calculate an adjustment to the speed to help slow down motion faster and minimize overshoot. The value in the table is multiplied by previous (larger) magnitude, and that number is subtracted from the current magnitude.

In general, the system requires a processor capable of performing A/D conversion on N-S and E-W signals of the $R^2$ VaraPoint sensor, and processing the resulting digital information through tracking algorithms, detecting and reporting click information, and communicating the information at rates consistent with human factors requirements. The reference implementation uses a typical 8-bit microprocessor running at 12 MHz, but considerable design flexibility is available. The reference design occupies 1.5K bytes of program space.

Typically, the system requires 4 pins for connection to X and Y sensors, but these pins can be shared with other functions. For example, in an application with a keypad and a VaraPoint in which keypad keys and the VaraPoint are not used simultaneously, pins can be time-multiplexed for both functions. The lines should be true tn-state, but if the processor can set the ports to input mode without internal or external pull-ups, they can be used.

Some microprocessors have integrated A/D support. These circuits can be used to implement VaraPoint, provided that they can be adjusted to provide adequate resolution for the resistance ranges (typically 5 bits or better), and this can result in significant savings in program memory requirements, that occupied by the ScanSensor routine.

The reference design firmware is written using the industry-standard 8051 instruction set. Conversion to other microprocessors using this basic instruction set should be straightforward. Conversion to processors with substantially different instruction sets should be a straightforward re-coding project, given the excellent internal documentation in the reference design source code.

Hardware Help

An embodiment of the invention provides "hardware help" for detecting and calibrating a "first touch."

Some pointing devices have no dome switches or other methods for detecting a "click" via increased pressure on the fingertip actuator. These systems typically implement one or more "click" switches via separate, external switches. With devices constructed in this manner, the device may not be in "presence" at all at the time of the click. Initial experimentation had involved the use of "first touch", which was to use the X-Y values detected at the transition from out-of-presence to presence operation. However, this system proved to be vulnerable to false centering when the user attempted to initiate pointing with immediate, fast movement. In such activity, the first point of contact typically represented a location significantly far away from the preferred "null point" Close observation revealed that this type of activity (called "hitting the decks running") could be not be easily distinguished from initiating the pointing with an intent to have no motion. We thus observed two distinctly different types of first-touches: "hitting the deck running", and (for lack of a better name) "Ninja landing". What we did observe was that all "Ninja landings" occurred at the user's preferred null location, and this point was always with the $R^2$ contact point very near the geometrical center of the contact area (FIG. 5). A "hit the decks running" first-touch looked more like FIG. 6. Note that no part of the contact point in FIG. 5 is particularly near the geometrical center of the contact area. This lead us to the "hardware help" improvement on "first touch", which is shown in FIG. 7. Note that there is a special contact point at the center of the contact area. When a "first touch" also involves contact with this contact point, we are assured that this "first touch" X-Y is a suitable location for auto-calibration. The size of the contact point covers a range of possible first touches adequate to correct for variations in hand placement and finger placement, but is not large enough to confuse "hit the decks running" with "Ninja" landings.

Reference should be made to the source code and other documentation provided as reference materials with this application. Specifically, the source code in several files under the subdirectory "fth-2btn" shows in detail those algorithms used to implement first touch with hardware help a preferred embodiment of the present invention.

Note that the auto-calibration aspects of the present invention shield the user from having to know about, or to take active concern, for auto-calibration.

For switched versions of the device, we note the following. If the user has just turned on a system that is somewhat out of calibration, the natural behavior will be to position the cursor above a target with some difficulty (because of the "drift"), release the device "out of presence", and then make a decisive click. This will automatically calibrate the device. The system requires only a few extra tens of bytes of code to implement this approach. The system must maintain state variables to track the state as "in presence" and "out of presence". The system must measure the time between entering "presence" and the time of the click, and compare it to a minimum amount of time.

For unswitched versions, the system requires an extra contact point and surrounding open area on the contact area as shown in FIG. 7. A microprocessor port (perhaps shared) is needed to "watch" for contact on the centering contact point.

Thus, the invention has been described with reference to particular embodiments thereof. However, variations from the disclosed specific embodiments are possible. The embodiments are but illustrative, and not restrictive, of the invention. The scope of the invention is to be determined solely by the appended claims.

What is claimed is:

1. A method for performing auto calibration in a relative pointing device for a computer user interface having,
   - a stick control for operation by the user;
   - a sensor surface having X and Y electrical signal values at various contact positions on said sensor surface;
   - a contact surface on which the sensor surface may or may not be in contact;
   - a contact actuated by the user through the stick control for movement between contact positions along the sensor surface;
   - the stick control having a central pointing position at which the user expects there to be no cursor movement, and having at this central pointing position X and Y electrical signal values, the stick control having positions displaced from the central pointing position to cause the cursor to move in a direction corresponding to the direction of the displacement, and at a speed corresponding to the magnitude of the displacement;
   - the sensor surface and contact outputting a pair of X and Y electrical signal values with respect to the position of the contact on the sensor plane, the process of auto calibration of the relative pointing device comprising the steps of:
     making contact between the contact surface and the sensor surface;

determining Xcenter and Ycenter values by recording the X and Y electrical signal values at the point in time when the contact is first established;

determining the current X and Y electrical signal values with respect to the position of the contact on the sensor plane at a subsequent time; and, calibrating the relative pointing device at the subsequent time by subtracting the recorded Xcenter and Ycenter values from the current X and Y electrical signal values.

2. The method for performing auto calibration in a relative pointing device for a computer user interface according to claim 1 including the further steps of:

providing a dome switch underlying the sensor plane;

determining the Xcenter and Ycenter values by recording the X and Y values at the point in time when the contact is first established, and then using these values as the Xcenter and Ycenter values if and only if closure of the dome switch occurs within a predetermined interval of time of the contact engaging the sensor plane; and, not adopting the Xcenter and Ycenter values upon closure of the dome switch beyond the predetermined interval of time.

3. The method for perform auto calibration in a relative pointing device for a computer user interface according to claim 1 and including the further steps of:

providing a central contact switch on the contact surface to interact with the sensor surface when the pointer is in the central pointing position for providing no cursor movement; and, determining the Xcenter and Ycenter values by recording the X and Y values at the point in time when the contact is first established, and then using these values as the Xcenter and Ycenter values if and only if the central contact switch was in contact.

4. The method for performing auto calibration in a relative pointing device for a computer user interface according to claim 1 and including the further steps of:

averaging a plurality of calibrating steps to determine the position of the relative pointing device for providing no pointing bias to the computer interface.

* * * * *